United States Patent [19]

Stackman

[11] 3,987,008

[45] Oct. 19, 1976

[54] FLAME RETARDANT POLYESTER

[75] Inventor: Robert William Stackman, Morris Township, N.J.

[73] Assignee: Celanese Corporation, New York, N.Y.

[22] Filed: Feb. 15, 1973

[21] Appl. No.: 332,832

Related U.S. Application Data

[63] Continuation-in-part of Ser. No. 209,423, Dec. 17, 1971, abandoned.

[52] U.S. Cl. .................. 260/45.95 D; 57/140 R; 260/45.7 P; 260/860
[51] Int. Cl.² ..................................... C08K 5/52
[58] Field of Search ........... 260/45.7 P, 47 P, 75 P, 260/860, 930

[56] References Cited
UNITED STATES PATENTS

| | | | |
|---|---|---|---|
| 2,636,876 | 4/1953 | Zenftman et al. | 260/61 |
| 2,926,145 | 2/1960 | McConnell et al. | 260/2 |
| 2,964,477 | 12/1960 | Pilat et al. | 252/49.8 |
| 3,169,925 | 2/1965 | Mahoney | 252/49.8 |
| 3,406,224 | 10/1968 | McDonough | 260/860 |
| 3,525,712 | 8/1970 | Kramer | 60/47 |
| 3,645,962 | 2/1972 | Schwarz | 260/40 |
| 3,681,281 | 8/1972 | Juelke et al. | 260/45.8 |
| 3,692,867 | 9/1972 | Mayer et al. | 260/857 |
| 3,705,209 | 12/1972 | Matlack et al. | 260/861 |
| 3,706,821 | 12/1972 | Anderson et al. | 260/951 |
| 3,719,727 | 3/1973 | Masai et al. | 260/860 |
| 3,761,543 | 9/1973 | Gunsher | 260/929 |

OTHER PUBLICATIONS
Goodman et al., "Polyesters," vol. 1, 1965, Preface.
Hilado, "Flammability Handbook for Plastics," 1969, pp. 82–86.

Primary Examiner—Donald E. Czaja
Assistant Examiner—R. A. White
Attorney, Agent, or Firm—Roderick B. Macleod

[57] ABSTRACT

Flame retardant polyester compositions are provided which comprise melt blends of a synthetic linear polyester with up to about 25 percent, based on the weight of polyester, of a polyphosphate having the following formula:

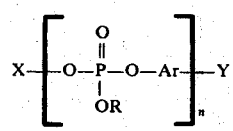

wherein Ar is a divalent radical having up to about 20 carbon atoms selected from arylene and haloarylene; R is a monovalent radical having up to about 20 carbon atoms selected from alkyl, aryl, haloalkyl and haloaryl; $n$ is an integer greater than 1; and X is a monovalent radical selected from the group consisting of H, alkyl, aryl, haloalkyl and haloaryl, Y is a monovalent radical selected from the group consisting of H, OH and

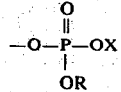

where X and R are as above.

7 Claims, No Drawings

FLAME RETARDANT POLYESTER

CROSS-REFERENCE TO RELATED APPLICATION

This is a continuation-in-part of my copending United States Ser. No. 209,423, filed Dec. 17, 1971 and now abandoned.

BACKGROUND OF THE INVENTION

This invention relates to synthetic linear polyester compositions containing phosphorus. More particularly, the invention relates to melt blends of synthetic linear polyesters with certain polyphosphates which impart flame retardant properties to said compositions.

As is well known, certain polyesters enjoy widespread commercial acceptance for the production of oriented shaped articles such as fibers and films. However, most polyesters, and poly(ethylene terephthalate) and poly(tetramethylene terephthalate) in particular are flammable, i.e., not only are deficient in their ability to resist ignition upon application of flame but are also deficient in their ability to self-extinguish. This flammability makes commercial polyesters unsuitable for the production of fibers and film to be employed in such end-uses as children's clothing and sleepwear, carpets, sheets, and draperies.

Although the prior art contains some examples of non-flammable polyester compositions, none have found commercial acceptance for oriented shaped articles. Unfortunately, efforts to provide non-flammable polyester compositions have been successful only at the expense of fiber properties, such as tenacity, elongation, initial modulus, resilience, resistance to pilling, and color. The term "non-flammable" as used herein means the ability of a composition or shaped article or product made therefrom to self-extinguish upon removal of the flame source, in air.

U.S. Pat. No. 3,829,405 describes inter alia phosphorus-containing polyester compositions having improved flame retardant properties wherein said compositions comprise melt blends of a synthetic linear polyester with up to about 25 weight percent of a poly(phosphonate-phosphate)copolymer having the following average general formula:

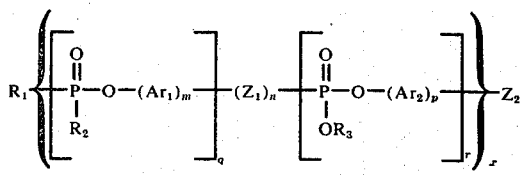

wherein $R_1$ is a monovalent radical having up to about 20 carbon atoms selected from the group consisting of alkoxy, aryloxy, hydroxy, haloalkoxy, haloaryloxy, hydroxyalkoxy, and hydroxyaryloxy; $R_2$ is a monovalent radical having up to 20 carbon atoms and is independently selected from the group consisting of hydrogen, alkyl, aryl, haloalkyl, and haloaryl; $R_3$ is a monovalent radical having up to 20 carbon atoms and is selected from the group consisting of alkyl, aryl, haloalkyl, and haloaryl; $Ar_1$ and $Ar_2$ are divalent radicals each having up to about 20 carbon atoms independently selected from the group consisting of arylene and haloarylene; $Z_1$ is a divalent radical selected from the group consisting of alkylene, arylene, haloalkylene, haloarylene, oxy, thio, and sulfonyl; $Z_2$ is either hydrogen or

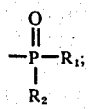

$m$, $n$, and $p$ are integers which independently are either 0 or 1 and at least one of $m$ and $p$ is 1; $q$ and $r$ are integers of at least 1; $x$ is greater than one.

SUMMARY OF THE INVENTION

It has now surprisingly been discovered that certain polyphosphate homopolymers, as compared with the forementioned poly(phosphonate-phosphate) copolymers, impart significantly superior flame retardant properties to a synthetic linear polyester, e.g., poly(ethylene terephthalate), and poly(tetramethylene terephthalate). Furthermore, the use of these polyphosphate flame retardants particularly with poly(ethylene terephthalate), permit equal flame retardant properties to be obtained with both a much cheaper additive and a lower concentration of additive.

It is therefore an object of the present invention to provide phosphorus-containing polyester compositions which are flame retardant or non-flammable, are economically acceptable, and are effective at low levels of concentration.

In accordance with this invention, it has been found that certain polyphosphate polymers are eminently suitable for providing phosphorus-containing polyester compositions which are flame retardant or nonflammable.

Polymers of the following structure

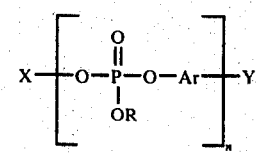

have been found to be useful for the preparation of flame retardant polyesters, wherein Ar is a divalent radical having up to about 20 carbon atoms selected from the group consisting of arylene and haloarylene; R is a monovalent radical having up to about 20 carbon atoms selected from the group consisting of alkyl, aryl, haloalkyl and haloaryl; $n$ is an integer greater than 1; X is a monovalent radical selected from the group consisting of H, alkyl, aryl, haloalkyl and haloaryl, Y is a monovalent radical selected from the group consisting of H, OH, and

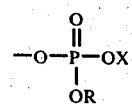

where X and R are as above.

DETAILED DESCRIPTION OF THE INVENTION

The polymeric polyphosphates of the present invention may be prepared by methods similar to those well known in the art. They may, for example, be prepared by the reaction of (a) phenol, and (b) tetrabromobisphenol A or resorcinol and (c) phosphorus oxychloride; the reaction of triaryl phosphate with resorcinol; the reaction of alkyl dihalophosphates with aromatic diols; and from the reaction of diphenyl alkyl phosphates with aromatic diols.

Melt polycondensation of the reactants (such as methoxy dichlorophosphate with resorcinol) frequently results in a colored polyphosphate. Use of inert diluents or high boiling solvents such as diphenyl ether or tetrachloroethane also frequently give a colored polyphosphate. However, the use of low temperature solution systems using acid acceptors is a preferred method of preparation since it frequently gives a colorless polyphosphate and tends to result in a linear polymer rather than a cross-linked polymer.

The polymeric polyphosphates as described hereinbefore have molecular weights varying within a wide range. Thus the polyphosphates may range from oligomers (i.e., n is in the range from 2 to about 4) to polymers containing up to 100 or more repeat units (i.e., n is equal to 100 or more). It is preferred to have n from about 3 to about 100 and most preferred from 3 to 10.

Melt blending of these polyphosphates with poly(ethylene terephthalate) and poly(tetramethylene terephthalate) typically results in a polymer with reduced flammability as shown by the increased Oxygen Index in the Examples. In general the polyester was melted together with the additive under study with constant stirring, under a nitrogen purge for 30 minutes at a temperature of 285–290° C. for poly(ethylene terephalate). It is preferred to incorporate from about 3 to about 15 weight percent of the polyphosphate, (e.g., about 5 to about 15 weight percent), and most preferably from 5 to 10 weight percent. The end groups X and Y depend upon the starting materials, but do not significantly alter the flame retardant properties of the polyphosphate.

The resulting melt blend of the synthetic linear polyester and the heretofore identified polyphosphates may be formed into a shaped article, (e.g., fiber or film), using conventional techniques commonly employed with polyesters.

The Oxygen Index Test employed herein was as follows: A ⅛ inch wide strip of 10 mil film was suspended vertically in the chimney of the apparatus purged with a gas containing a known percentage of oxygen and then contacted on the bottom by a vertical micro hydrogen-oxygen flame 1/16 inch long and 1/32 inch in diameter at a temperature of 1350° C. The torch was then withdrawn one second after ignition occurred and the lowest oxygen level at which polymer continued to burn for an observable period, usually, less than one second, was recorded as the Oxygen Index. If a burn was unobtainable, the oxygen level was recorded and raised.

The following Examples illustrate applicant's invention but are not to be deemed limitative thereof. In all the Examples the average value of n for the polyphosphate was about 5.

EXAMPLES 1 – 8

Poly(ethylene terephthalate) having an intrinsic viscosity of 0.6 deciliters/gram, determined at 8% concentration in o-chlorophenol at 25° C., was melted together with the additive under study with constant stirring, under a nitrogen purge for 30 minutes at a temperature of 285°–290° C. The Oxygen Index was determined by the test given above. The results are given in Table 1. Example 1 is a control example.

EXAMPLES 9 – 12

Poly(tetramethylene terephthalate) was melted together with the additive under study with constant stirring, under a nitrogen purge for 30 minutes at a temperature of 255°–260° C. The Oxygen Index was determined by the test given above. The results are given in Table 2. Example 9 is a control example.

EXAMPLES 13 – 15

Examples 1 – 8 were repeated with the exception that the additive was the particularly preferred polyphosphate indicated. The Oxygen Index was determined by the test given above. The results are given in Table 3. Example 13 is a control example.

EXAMPLES 16 – 18

Examples 9 – 12 were repeated with the exception that the additive was the particularly preferred polyphosphate indicated. The Oxygen Index was deter mined by the test given above. The results are given in Table 3. Example 16 is a control sample.

TABLE 1

OXYGEN INDEX OF POLY (ETHYLENE TEREPHTHALATE) CONTAINING POLYPHOSPHATES

| Example No. | R | Ar | X | Y | Wt. % | Oxygen Index % |
|---|---|---|---|---|---|---|
| 1. | — | — | — | — | — | 17.0 |
| 2. |  |  | 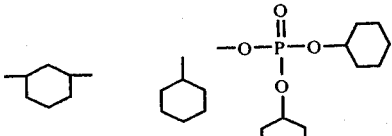 |  | 5 | 17.7 |
| 3. | | | | | 10 | 19.4 |
| 4. | | | | | 15 | 21.9 |
| 5. | —CH₃ |  | —H | 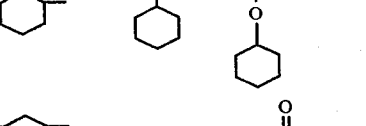 | 10 | 22.0 |
| 6. | —CH₃ |  | —H |  | 10 | 20.2 |
| 7. | —CH₃ | 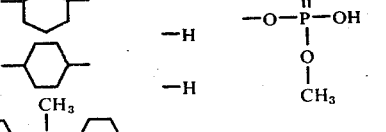 | —H | | 10 | 20.5 |

TABLE 1-continued

OXYGEN INDEX OF POLY (ETHYLENE TEREPHTHALATE) CONTAINING POLYPHOSPHATES

| Example No. | Additive | | | | Wt. % | Oxygen Index % |
|---|---|---|---|---|---|---|
| | R | Ar | X | Y | | |
| 8. | $-C_2H_5$ | 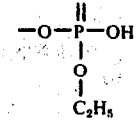 | $-H$ |  | 10 | 19.8 |

TABLE 2

OXYGEN INDEX OF POLY (TETRAMETHYLENE TEREPHTHALATE) CONTAINING POLYPHOSPHATES

| Example No. | Additive | | | | Wt. % | Oxygen Index % |
|---|---|---|---|---|---|---|
| | R | Ar | X | Y | | |
| 9. | — | — | — | — | — | 16.5 |
| 10. |  |  |  | 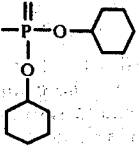 | 5 | 18.5 |
| 11. | | | | | 7 | 18.8 |
| 12. | | | | | 10 | 19.1 |

TABLE 3

OXYGEN INDEX OF POLY (ETHYLENE TEREPHTHLATE) CONTAINING PARTICULARLY PREFERRED POLYPHOSPHATE

| EXAMPLE NO. | Additive | | | | Wt. % | Oxygen Index % |
|---|---|---|---|---|---|---|
| | R | Ar | X | Y | | |
| 13. | — | — | — | — | — | 17.0 |
| 14. | 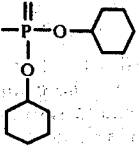 |  |  |  | 10 | 19.0 |
| 15. | | | | | 15 | 20.8 |

TABLE 4

OXYGEN INDEX OF POLY (TETRAMETHYLENE TEREPHTHALATE) CONTAINING PARTICULARLY PREFERRED POLYPHOSPHATE

| EXAMPLE NO. | Additive | | | | Wt. % | Oxygen Index % |
|---|---|---|---|---|---|---|
| | R | Ar | X | Y | | |
| 16. | — | — | — | — | — | 16.5 |
| 17. | 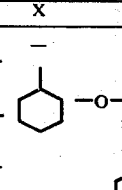 |  |  |  | 10 | 18.5 |
| 18. | | | | | 15 | 20.4 |

Having thus disclosed the invention, what is claimed is:

1. Fiber comprising phosphorus-containing polyester compositions having improved flame retardant properties wherein said compositions comprise melt blends of a synthetic linear polyester selected from the group consisting of poly(ethylene terephthalate) and poly(tetramethylene terephthalate) with up to about 25 weight percent of a polyphosphate having the following general formula:

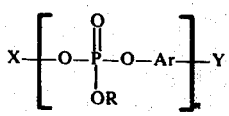

wherein Ar is an arylene group having up to about 20 carbon atoms; R is a monovalent radical having up to about 20 carbon atoms selected from the group consisting of alkyl and aryl; $n$ is an integer greater than 1; and X is a monovalent radical selected from the group consisting of alkyl and aryl; Y is a monovalent radical selected from the group consisting of H, OH and

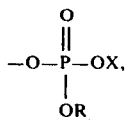

where X and R are as above.

2. The polyester compositions of claim 1 wherein R is an aryl group.

3. The polyester compositions of claim 1, wherein said polyphosphate is present in an amount of from 3 to 15 weight percent.

4. The polyester compositions of claim 3 wherein said polyphosphate is present in an amount of from 5 to 10 weight percent.

5. The polyester compositions of claim 1, wherein $n$ has a value from 3 to 100.

6. The polyester compositions of claim 5, wherein $n$ has a value from 3 to 10.

7. A fiber having an Oxygen Index greater than 20, comprising a melt blend of poly(ethylene terephthalate) with from 5 to 15 weight percent of a polyphosphate having the following general formula:

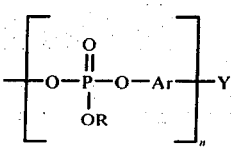

wherein Ar is

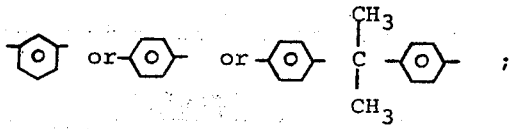

R is —CH$_3$ or —C$_2$H$_5$ or

$n$ is from 3 to 100; and X is a monovalent radical selected from the group consisting of alkyl and aryl; Y is a monovalent radical selected from the group consisting of H, OH, and $$-\text{O}-\overset{\overset{\text{O}}{\|}}{\underset{\underset{\text{OR}}{|}}{\text{P}}}-\text{OX}$$

where X and R are as above.

* * * * *